US008442828B2

(12) United States Patent
Wang et al.

(10) Patent No.: US 8,442,828 B2
(45) Date of Patent: May 14, 2013

(54) CONDITIONAL MODEL FOR NATURAL LANGUAGE UNDERSTANDING

(75) Inventors: Ye-Yi Wang, Redmond, WA (US); Alejandro Acero, Bellevue, WA (US); John Sie Yuen Lee, Redmond, WA (US); Milind V. Mahajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1805 days.

(21) Appl. No.: 11/378,710

(22) Filed: Mar. 17, 2006

(65) Prior Publication Data

US 2007/0129936 A1     Jun. 7, 2007

Related U.S. Application Data

(60) Provisional application No. 60/741,743, filed on Dec. 2, 2005.

(51) Int. Cl.
*G10L 15/18*     (2006.01)
*G10L 15/14*     (2006.01)

(52) U.S. Cl.
USPC ......... 704/255; 704/250; 704/256.4; 704/256

(58) Field of Classification Search .......... 704/250, 704/255, 256.4, 1–9, 275
See application file for complete search history.

(56) References Cited

U.S. PATENT DOCUMENTS

| | | | | |
|---|---|---|---|---|
| 6,629,066 | B1 * | 9/2003 | Jackson et al. ..................... | 704/9 |
| 2003/0055623 | A1 * | 3/2003 | Epstein et al. ..................... | 704/1 |
| 2003/0216905 | A1 * | 11/2003 | Chelba et al. ..................... | 704/9 |
| 2004/0085162 | A1 * | 5/2004 | Agarwal et al. ................ | 333/196 |
| 2004/0220809 | A1 * | 11/2004 | Wang et al. ..................... | 704/257 |

FOREIGN PATENT DOCUMENTS

| | | | |
|---|---|---|---|
| WO | WO 0193246 A2 | * | 12/2001 |
| WO | WO 0193249 A1 | * | 12/2001 |

OTHER PUBLICATIONS

A. McCallum "Efficiently Inducing Features of Conditional Random Fields", Computer Science Department. University of Massachusetts Amherst, 2003, pp. 1-8.*
Choi et al. "Identifying Source of opinion with Conditional Random Fields and Extraction Patterns", In Proceedings of HLT/EMNLP 2005, pp. 1-8. www.cs.utah.edu/~riloff/pdfs/emnlp05.pdf.*
Settles "Biomedical Named Entity Recognition UsingConditional Random Fields and Rich Feature Sets", In Proceedings of the international joint workshop, 2004, pp. 1-4.*
Wallach "Efficient training of conditional random fields", Proc. 6th Annual CLUK Research Colloquium, 2002, pp. 1-78.*
Sha et al. "Shallow parsing with conditional random fields", Proceedings of HLT-NAACL, 2003, pp. 1-8.*
J. Lafferty et al., Conditional Random Fields: Probabilistic Models for Segmenting and Labeling Sequence Data. ICML, pp. 1-8, 2001.*
Statistical Spoken Language Understanding: From Generative Model to Conditional Model. Ye-Yi Wang et al. 4 pages.

(Continued)

*Primary Examiner* — Pierre-Louis Desir
*Assistant Examiner* — Abdelali Serrou
(74) *Attorney, Agent, or Firm* — Westman, Champlin & Kelly, P.A.

(57) ABSTRACT

A conditional model is used in spoken language understanding. One such model is a conditional random field model.

14 Claims, 7 Drawing Sheets

OTHER PUBLICATIONS

Conditional Random Fields: Probabilistic Models for Segmenting and Labeling Sequence Data. John Lafferty et al. 8 pages.
Hidden Conditional Random Fields for Phone Classification. Asela Gunawardana et al., INTERSPEECH 2005, pp. 1117-1120.
Spoken Language Understanding. Ye-Yi Wang et al., IEEE Signal Processing Magazine, Sep. 2005.pp. 16-31.
PCT Search Report Application No. PCT/US2006/044675, filed Nov. 17, 2006.

* cited by examiner

FIG. 1

```
<frame name="ShowFlight" toplevel="true">
    <slot name="Flight" filler="Flight"/>
</frame>
<frame name="GroundTrans" toplevel="true">
    <slot name="City" filler="City"/>
</frame>
<frame name="Flight">
    <slot name="DCity" filler="City"/>
    <slot name="ACity" filler="City"/>
</frame>
```

FIG. 2

```
<ShowFlight">
    <Flight>
        <DCity type="City">Seattle</DCity>
        <ACity type="City">Boston</ACity>
    </Flight>
</ShowFlight>
```

I need two tickets to Washington D.C.
          Time               City    City
      Number         State
                         City

CONDITIONAL MODEL FOR NATURAL LANGUAGE UNDERSTANDING

The present application is based on and claims the benefit of U.S. provisional patent application Ser. No. 60/741,743, filed Dec. 2, 2005, the content of which is hereby incorporated by reference in its entirety.

BACKGROUND

Recognizing and understanding spoken human speech is believed to be integral to future computing environments. To date, the tasks of recognizing and understanding spoken speech have been addressed by speech recognition systems and spoken language understanding (SLU) systems. An SLU system is a type of natural language understanding (NLU) system in which the input to the SLU system is specifically spontaneous speech utterances, which are noisy and full of disfluencies such as false starts, hesitations, repetitions repairs, etc.

Current speech recognition systems receive a speech signal indicative of a spoken language input. Acoustic features are identified in the speech signal and the speech signal is decoded, using both an acoustic model and a language model, to provide an output indicative of words represented by the input speech signal.

Spoken language understanding addresses the problem of extracting semantic meaning conveyed by a user's utterance. This problem is often addressed with a knowledge-based approach. To a large extent, many implementations have relied on manual development of domain-specific grammars. The task of manually developing such grammars is time consuming, error prone, and requires a significant amount of expertise in the domain.

Other approaches involve different data-driven statistical models. Statistical grammars (models) can be used in development of speech enabled applications and services use example-based grammar authoring tools. These tools ease grammar development by taking advantage of many different sources of prior information. They allow a developer, with little linguistic knowledge, to build a semantic grammar for spoken language understanding.

In speech recognition and natural language processing, Hidden Markov Models (HMMs) have been used extensively to model the acoustics of speech or the observations of text. HMMs are generative models that use the concept of a hidden state sequence to model the non-stationarity of the generation of observations from a label. At each frame of an input signal (or word), the HMM determines the probability of generating that frame from each possible hidden state. This probability is determined by applying a feature vector derived from the frame of speech (or text) to a set of probability distributions associated with the state. In addition, the HMM determines a probability of transitioning from a previous state to each of the states in the Hidden Markov Model. Using the combined transition probability and observation probability, the Hidden Markov Model selects a state that is most likely to have generated a frame.

In the field of sequence labeling, conditional random field models have been used that avoid some of the limitations of Hidden Markov Models. In particular, conditional random field models allow observations taken across an entire utterance to be used at each frame when determining the probability for a label in the frame. In addition, different labels may be associated with different features, thereby allowing a better selection of features for each label.

The current statistical learning approach for training statistical models exploit the generative models used for spoken language understanding. However, data sparseness is a problem associated with such approaches. In other words, without a great deal of training data, the purely statistical spoken language understanding models can lack robustness and exhibit brittleness.

The discussion above is merely provided for general background information and is not intended to be used as an aid in determining the scope of the claimed subject matter.

SUMMARY

A conditional model is used in spoken language understanding. One such model is a conditional random field model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present subject matter deals with using a conditional model in natural language understanding, or spoken language understanding. However, before describing this subject matter in more detail, one illustrative environment in which the subject matter can be practiced will be described.

Figure 1:
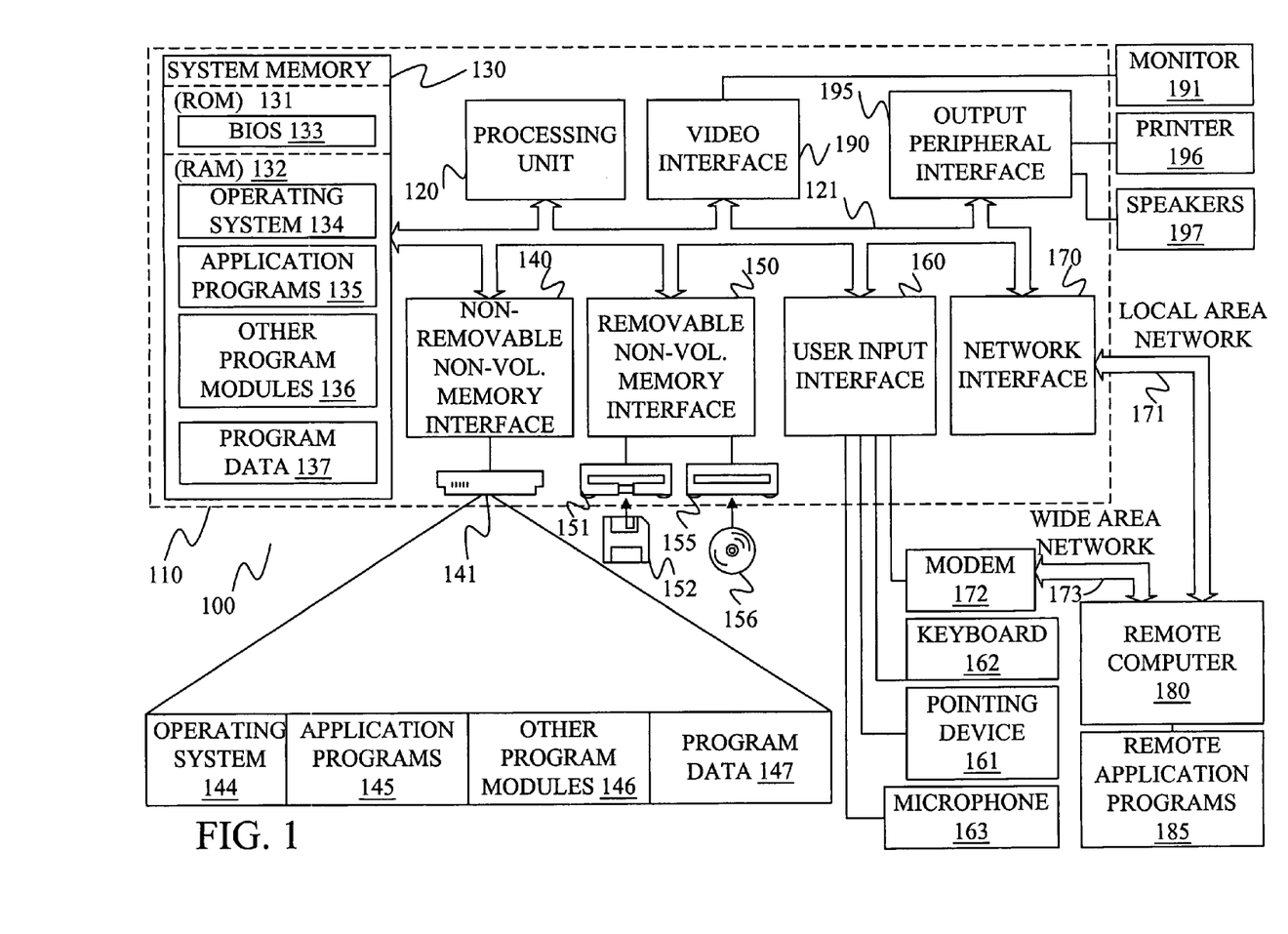
FIG. 1 is a block diagram of one illustrative computing environment in which the present subject matter can be used.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

In a spoken language understanding systems, the semantic meaning conveyed in a user's utterance is extracted. As indicated in the background, this problem has traditionally been solved with a knowledge-based approach, in which understanding grammars are developed manually by spoken language understanding experts. In the past decade, a variety of different data-driven statistical models have been proposed as an alternate to the knowledge-based approach. Most of the statistical learning approaches suffer from the data sparseness problem. However, in one recent approach, a Hidden Markov Model/context free grammar (HMM/CFG) composite model has been developed as another generative model that integrates a knowledge-based approach used in a statistical learning framework. The inclusion of prior knowledge in the HMM/CFG composite model compensates for the dearth of data available for training the model. The present subject matter first discusses the HMM/CFG generative model and then discusses how to ultimately obtain a conditional model (such as a conditional random field model) and use the conditional random field model along with certain features, in natural language understanding, or spoken language understanding.

Given a word sequence W, a spoken language understanding component attempts to find the semantic representation of the meaning M that has the maximum a posteriori probability Pr(M|W):

$$\hat{M} = \underset{M}{\operatorname{argmax}} Pr(M|W) = \underset{M}{\operatorname{argmax}} Pr(W|M) \cdot Pr(M) \qquad \text{Eq. 1}$$

where Pr(M|W) is the probability of W given M; and Pr(M) is the prior probability of M.

The composite HMM/CFG model integrates domain knowledge by setting the topology of the prior model, Pr(M), according to the domain semantics, and by using probabilistic context free grammar (PCFG) rules as part of the lexicalization model Pr(W|M).

Figure 2:
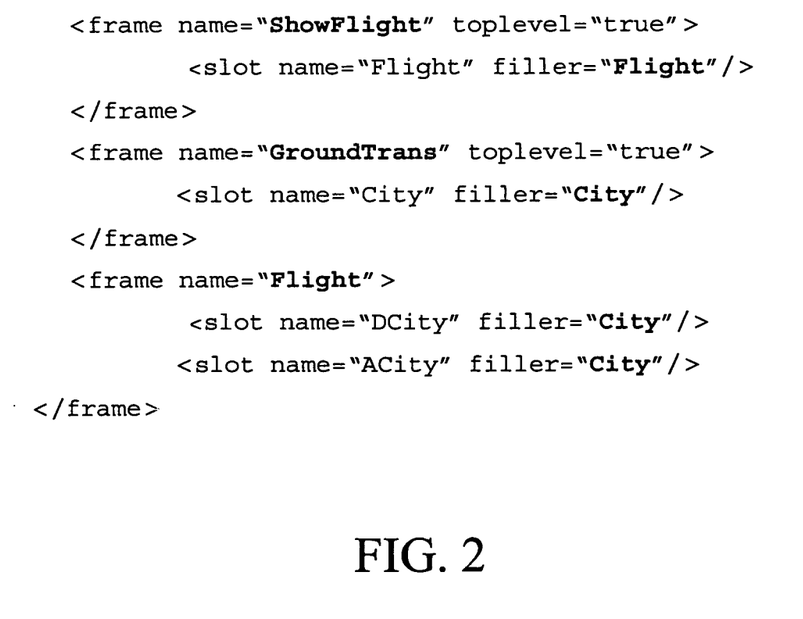
FIG. 2 illustrates a simplified example of two semantic frames in a travel domain.

The domain semantics define an application's semantic structure with semantic frames. FIG. 2 shows a simplified example of two semantic frames in the air transportation domain known as the ATIS domain. The two frames with "toplevel" attributes are also known as commands. A filler specifies the semantic object (covered by the corresponding CFG rule) that can fill a slot in the semantic structure. For instance, an object that is an instantiation of the "Flight" frame can be the filler for the "Flight slot" of the "Show-Flight" frame, and a string covered by the "City" rule in a CFG can be the filler of the "Acity" (ArriveCity) or the "DCity" (DepartCity) slot.

Figure 3:
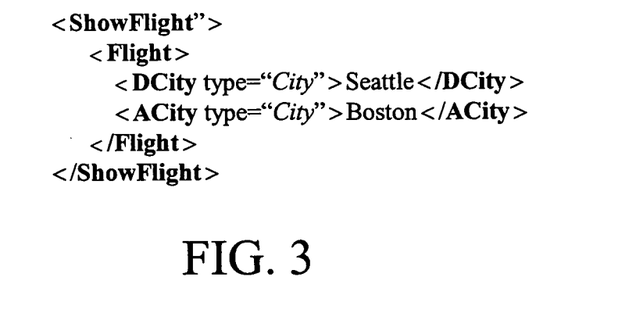
FIG. 3 illustrates a semantic representation for a particular natural language input.

FIG. 3 shows a meaning representation according to the domain semantics shown in FIG. 2. FIG. 3 specifically illustrates the semantic representation for the natural language input "Show me the flights departing from Seattle arriving at Boston" as an instantiation of the semantic frames shown in FIG. 2.

Figure 4:
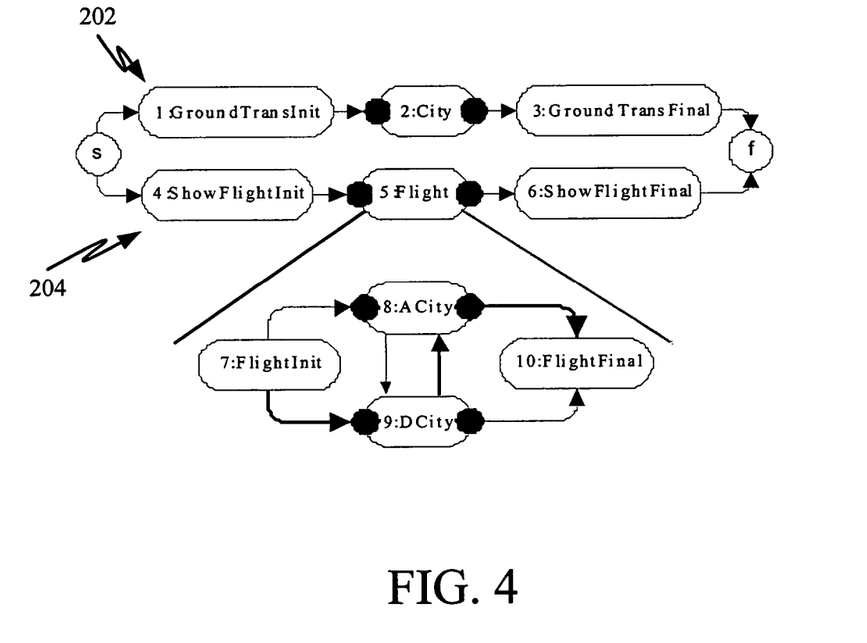
FIG. 4 illustrates the topology of underlying states in a stistical model for the semantic frames illustrated in FIG. 2.

FIG. 4 shows a state topology for a composite HMM/CFG model, as determined by the semantic frames shown in FIG. 2. The HMM topology and state transition probabilities comprise a semantic prior model. The topology is determined by the domain semantics defined by the frames and the transition probabilities are estimated from training data.

At the top of the topology illustrated in FIG. 4, the transition network for the top-level commands are illustrated at 202 and 204, respectively. Each of the states in FIG. 4 is numbered, and state 1 and state 4 are called precommands. State 3 and state 6 are called postcommands. States 2, 5, 8 and 9 represent slots. The slots represented by states 2, 5, 8 and 9 are actually three-state sequences, in that each slot is bracketed by a preamble and a postamble that serve as the contextual clue for the slot's identity. The preamble and postamble are represented by the dots on the slot states 2, 5, 8 and 9 in FIG. 4.

A lexicalization model, Pr(W|M) from Eq. 1, depicts a process by which sentences are generated from the topology shown in FIG. 4. The lexicalization model models a distribution for a state in the topology to emit words. It uses state-dependent n-grams to model the precommands, postcommands, preambles and postambles, and uses CFG rules to model the fillers of a slot. The use of knowledge-based CFG rules compensates for the sparseness of domain-specific data.

Figure 5:
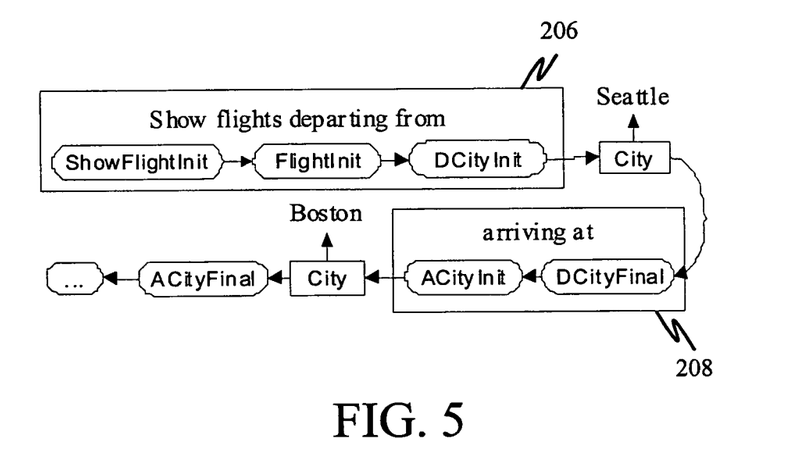
FIG. 5 illustrates word and state alignments given the semantic representation shown in FIG. 3 and the state sequence model topology shown in FIG. 4.

Given the semantic representation (such as for a training example) shown in FIG. 3, the state sequence through the model topology shown in FIG. 4 is deterministic. This is illustrated in FIG. 5 which shows an alignment between words in the example and states in the model topology. The specific alignments of the individual words to the states in the boxes 206 and 208 are not labeled. In other words, the segmentation of the word sequences in the shaded boxes 206 and 208 is hidden. An EM algorithm is applied to train state-specific n-gram models, where the EM algorithm treats the alignments as hidden variables.

The HMM/CFG composite model described thus far leads to better performance than even some of the best manually developed systems. The above discussion illustrates the importance of including prior knowledge into training of the models to accommodate for data sparseness.

One embodiment of the present subject matter applies conditional models to NLU or SLU. The present discussion first proceeds with respect to conditional models and then with respect to generating a conditional model using prior knowledge and the state topology and features used in the HMM/CFG composite model. Finally, using the conditional model for spoken language understanding, and the incorporation of additional features, will be described in more detail.

Figure 6:
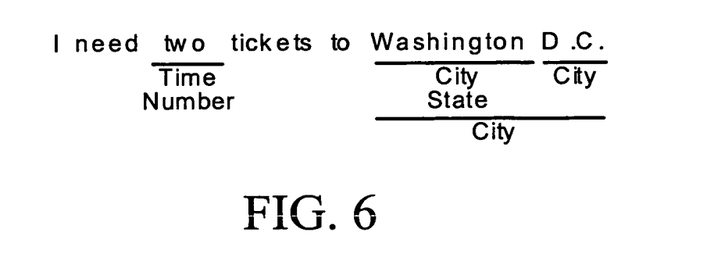
FIG. 6 shows an observation that includes a word sequence and subsequences covered by CFG non-terminal symbols.

The problem of applying a conditional model to spoken language understanding is formulated by assigning a label l to each word in a word sequence $o_l^\tau$ of an observation o. Here o includes a word vector $o_l^\tau$ and CFG non-terminals that cover subsequences of $o_l^\tau$. FIG. 6 shows an exemplary observation that has a word sequence, and also shows the subsequences covered by CFG non-terminal symbols. The observation set out in FIG. 6 is "I need two tickets to Washington D.C.". The task for the conditional model is to label "two" as the NumOfTickets slot of the ShowFlight command, and label "Washington D.C." as the ArriveCity slot for the same command. To do so, the model must be able to resolve a number of ambiguities.

For instance, there is an ambiguity as to whether items are a filler or non-filler. For example, the word "two" may be a "NumOfTickets" slot filler or it can be part of the preamble of the "ArriveCity" slot. Another ambiguity is a CFG non-terminal ambiguity. For instance, the word "Washington" might be a city or a state. Still another ambiguity is a segmentation ambiguity. For instance, the term "Washington D.C." could be segmented as [Washington] [D.C.] or [Washington D.C.]. The first represents two city names (or a state and a city name) and the second stands for a single city name. Yet another ambiguity is a semantic label ambiguity. For instance "Washington D.C."could be labeled with the "ArriveCity" semantic label or with the "DepartCity" semantic label.

Conditional Random Fields (CRFs) are undirected conditional graphical models that assign a conditional probability of a state (a label) sequence $s_1^\tau$ with respect to a vector of the features $f(s_1^\tau, o_1^\tau)$. CRF models are of the form:

$$p(s_1^\tau | o; \lambda) = \frac{1}{z(o;\lambda)} \exp(\lambda \cdot f(s_1^\tau, o)). \quad \text{Eq. 2}$$

The parameter vector $\lambda$ is trained conditionally (such as discriminatively). $z(o;\lambda)$ is a partition function that ensures the model is a properly normalized function. If it is assumed that $S_1^\tau$ is a Markov chain given observation o, then $$p(s_1^\tau | o; \lambda) = \frac{1}{z(o;\lambda)} \exp\left(\sum_k \lambda_k \sum_{t=1}^{\tau} f_k(s^{(t-1)}, s^{(t)}, o, t)\right) \quad \text{Eq. 3}$$

In some cases, such as with word/state alignments, as in FIG. 5, it may be natural to define feature vectors that depend on variables that are not directly observed. For example, the following feature may be defined in terms of an observed word and an unobserved state in regions 206 and 208 in FIG. 5:

$$f_{FlightInit,flights}(s^{(t-1)}, s^{(t)}, o, t) = \quad \text{Eq. 4}$$
$$\begin{cases} 1 & \text{if } s^{(t)} = FlightInit \wedge o' = \text{flights}; \\ 0 & \text{otherwise} \end{cases}$$

In this case, the state sequence $S_1^\tau$ is used in the model, but the sequence is only partially labeled in the observation as $l(S_5)$ ="DepartCity" $l(S_8)$="ArriveCity" for the words "Seattle" and "Boston". The state for the remaining words are hidden variables. The conditional probability of the partially observed label can be obtained by summing over all possible values of the hidden variables, as follows:

$$P(l|o; \lambda) = \frac{1}{z(o;\lambda)} \sum_{s_1^\tau \in \Gamma(l)} \exp\left(\sum_k \lambda_k \sum_{t=1}^{\tau} f_k(s^{(t-1)}, s^{(t)}, o, t)\right) \quad \text{Eq. 5}$$

Here $\Gamma(l)$ represents the set of all state sequences that satisfy the constraints imposed by the observed label l. CRFs with features depending on hidden variables are called Hidden Conditional Random Fields (HCRFs).

It should be noted that both CRFs and HCRFs can be trained with gradient-based optimization algorithms that maximize the log conditional likelihood. The gradient of the log conditional likelihood is given as follows:

$$\nabla_\lambda L(\lambda) = E_{P_{L,O} P_{s_1^T | L,O}} [f(S_1^T, O); \lambda] - E_{P_O P_{s_1^T | O}} [f(S_1^T, O); \lambda] \quad \text{Eq. 6}$$

where the first term on the right side of Eq. 6 represents the conditional expectation of the feature vector given the observation sequence and label, and the second term on the right side of the equation represents its conditional expectation given only the observation sequence. Due to the Markov assumption made earlier in Eq. 3, the expectations in Eq. 6 can be computed using a forward-backward like dynamic programming algorithm. In one embodiment, stochastic gradient decent (SGD) can be used for model training.

Considering the state topology and features as described above with respect to FIGS. 1-5 and the HMM/CFG composite model, a conditional model can be developed to account for prior knowledge.

Figure 7:
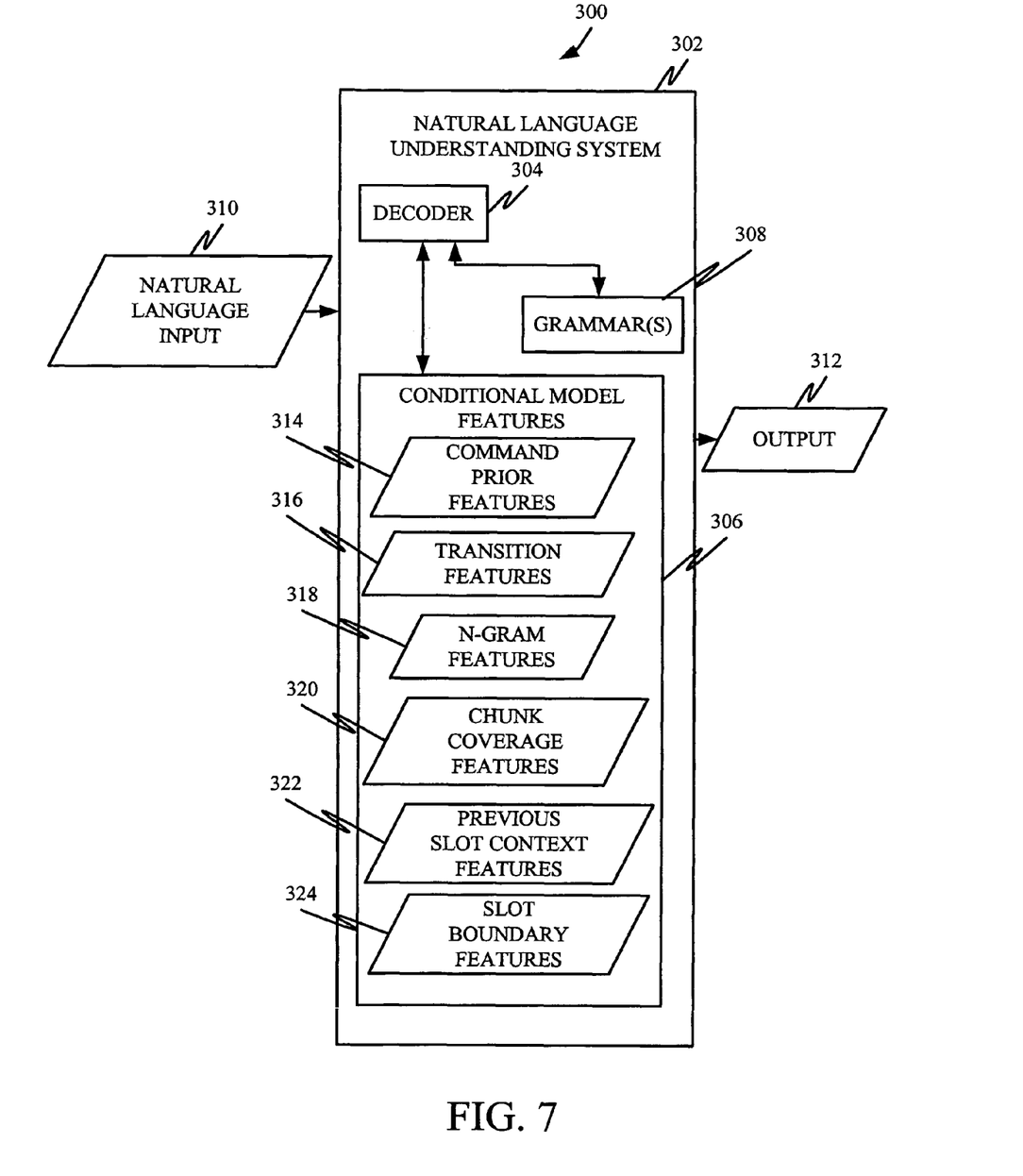
FIG. 7 is an illustrative block diagram of a natural language understanding system using a conditional model.
Figure 8:
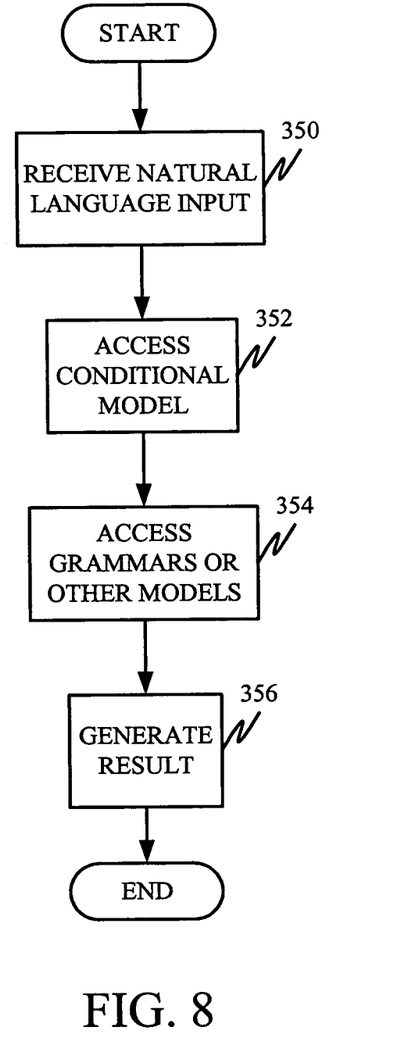
FIG. 8 is a flow diagram illustrating one embodiment of the operation of the system shown in FIG. 6.

FIG. 7 is a block diagram of an environment 300 that uses a conditional model in a natural language understanding system 302. Environment 300 is shown with an embodiment of natural language understanding system 302 that includes a decoder 304, a conditional model 306 and one or more optional grammars 308 (which can be, for example, context free grammars (CFGs) with rules that cover terminals and non-terminals). System 302 is shown receiving a natural language input 310 and generating an output 312 in a desired form. FIG. 8 is a flow diagram that better illustrates the overall operation of the system shown in FIG. 7.

Natural language understanding system 302 first receives natural language input 310, which can be the output from a speech recognizer. This is indicated by block 350 in FIG. 8. Decoder 304 then accesses conditional model 306 based on the natural language input. This is indicated by block 352 in FIG. 8.

Decoder 304 can also optionally access one or more grammars 308. This is indicated by block 354. Decoder 304 then generates the output or result 312, as indicated by block 356.

In the embodiment shown in FIG. 7, conditional model 306 includes a plurality of conditional model features to account for prior knowledge. The features illustratively include Command Prior features 314, Transition features 316, N-gram features 318, Chunk Coverage features 320, Previous Slot Context features 322 and Slot Boundary features 324. The Command Prior features 314, Transition features 316 and N-gram features 318 correspond to those discussed below in Equations 7, 8 and 9, respectively. In one embodiment, however, additional features 320, 322 and 324 are provided as well, in order to improve the natural language understanding result. These features are also discussed in more detail with respect to Equations 11, 12 and 13.

If the state sequence is only partially labeled (such as that shown in FIG. 5), a HCRF can be used to model the conditional distribution of labels. However, if the state sequence is fully labeled (i.e., if the word/state alignments are known) then a CRF can be used. A number of different features can be included in the conditional model.

One such feature is referred to as the Command Prior feature 314. This feature captures the prior likelihood of observing different top-level commands as follows:

$$f_c^{PR}(s^{(t-1)}, s^{(t)}, o, t) = \qquad \text{Eq. 7}$$

$$\begin{cases} 1 & \text{if } t = 0 \wedge C(s^{(t)}) = c \\ 0 & \text{otherwise} \end{cases}, \forall c \in CommandSet.$$

In Eq. 7, C(s) stands for the name of the top-level command corresponding to the transition network containing the state s.

Another feature, referred to as a Transition feature 316, captures the likelihood of transition from one state to another (e.g., from a PreDepartureCity state to a DepartureCity state), as follows:

$$f_{s_1,s_2}^{TR}(s^{(t-1)}, s^{(t)}, o, t) = \begin{cases} 1 & \text{if } s^{(t-1)} = s_1, s^{(t)} = s_2 \\ 0 & \text{otherwise} \end{cases}, \qquad \text{Eq. 8}$$

$\forall s_1, s_2 | s_1 \to s_2$ is a legal trasnition in model topology.

Another feature, referred to as N-gram feature 318, is discussed herein as unigram and bigram features. The N-gram feature 318 captures the words that a state emits, as follows:

$$f_{s,w}^{UG}(s^{(t-1)}, s^{(t)}, o_1^\tau, t) = \begin{cases} 1 & \text{if } s^{(t)} = s \wedge o^t = w \\ 0 & \text{otherwise} \end{cases}, \qquad \text{Eq. 9}$$

$$f_{s,w_1,w_2}^{BG}(s^{(t-1)}, s^{(t)}, o_1^\tau, t) =$$

$$\begin{cases} 1 & \text{if } s^{(t-1)} = s \wedge s^{(t)} = s \wedge o^{t-1} = w_1 \wedge o^t = w_2 \\ 0 & \text{otherwise} \end{cases},$$

$\forall s | \neg isFiller(s); \forall w, w_1 w_2 \in TrainingData$

While the Command Prior feature and the Transition feature do not depend on the particular observation, the N-gram feature does. It indicates how likely the given word in the observation is, given the state associated with that word.

In one embodiment, the model can be trained with SGD in different ways to initialize the parameters. For instance, a flat start initialization sets all parameters to 0. Also, the model can be trained as a HMM/CFG composite model, and a generative model initialization process converts the parameters of the HMM/CFG composite model to the conditional model.

Figure 9:
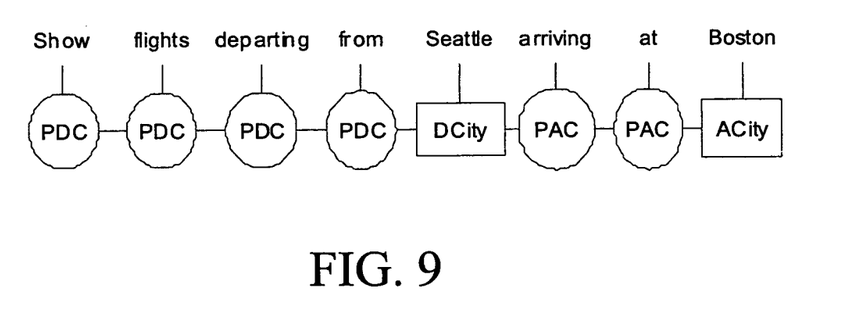
FIG. 9 illustrates a state sequence in which words are aligned with states.

It should be noted that, in one illustrative embodiment, in order to apply conditional models, one only needs to find the important cues that help identify slots. There is no need to accurately estimate the distribution of generating every word in a sentence. Hence the separation of precommands, preambles, postcommands and postambles is not necessary. Instead, every word that appears between two slots can be labeled as the preamble state of the latter slot. One example of this is shown in FIG. 9, which illustrates that the state sequence is deterministic once the slots are marked in the simplified model topology. This effectively removes the hidden variables and greatly simplifies the model to a CRF. This not only improves the speed of model training, but also avoids settling at a local optimum because the log conditional likelihood is a convex function in the CRF model.

In this type of CRF model, for the unigram and bigram features discussed above, only the unigrams and bigrams that occur in front of a CFG non-terminal that can be the filler of a slot are included as the features for the preamble state of that slot as follows:

$$f_{s,w}^{UG}(s^{(t-1)}, s^{(t)}, o_1^\tau, t) = \begin{cases} 1 & \text{if } s^{(t)} = s \wedge o^t = w \\ 0 & \text{otherwise} \end{cases}, \qquad \text{Eq. 10}$$

$$f_{s,w_1,w_2}^{BG}(s^{(t-1)}, s^{(t)}, o_1^\tau, t) =$$

$$\begin{cases} 1 & \text{if } s^{(t-1)} = s \wedge s^{(t)} = s \wedge o^{t-1} = w_1 \wedge o^t = w_2 \\ 0 & \text{otherwise} \end{cases},$$

$\forall s | \neg isFiller(s);$ $\forall w, w_1 w_2 |$ in the training data, $w, w_1 w_2$ appears in front of sequence covered by a CFG rule that is the filler of the slot preambled by s.

One advantage of CRFs over generative models is that more non-independent, non-homogeneous features can be introduced to the model. Therefore, the Chunk Coverage features 320 can be introduced to the model to address a side effect of not modeling the generation of every word in a sentence. If a preamble state has never occurred in a position that is confusable with a filler of a slot, and a word in the filler has never occurred as part of the preamble, then the unigram feature of the word for that preamble has a weight of 0. In such case, there is no penalty for mislabeling the word as the preamble. The Chunk Coverage features (320 in FIG. 7) are introduced so the model learns the likelihood of a word covered by a CFG non-terminal being labeled as a preamble as follows:

$$f_{c,NT}^{CC}(s^{(t-1)}, s^{(t)}, o, t) = \qquad \text{Eq. 11}$$

$$\begin{cases} 1 & \text{if } C(s^{(t)}) = c \wedge covers(NT, o^i) \wedge isPres(s^{(t)}) \\ 0 & \text{otherwise} \end{cases}$$

In Eq. 11, isPre(s) indicates that s is a preamble state.

In many cases the identity of a slot depends on the preambles of the slot in front of it. For example, "at two PM" is a DepartTime in the text fragment "flight from Seattle to Boston at two PM", but it is an ArriveTime in the text fragment "flight departing from Seattle arriving in Boston at two PM." In both cases, its previous slot (filled by "Boston") is labeled as an ArriveCity, so the transition features will not be helpful for slot identity disambiguation. In cases like this, the identity of the time slot depends on the preamble of the ArriveCity slot (that is, "to" in the first text fragment and "in" in the second). The Previous Slot's Context features 322 introduce this dependency to the model as follows:

$$f_{s_1,s_2,w}^{PC}(s^{(t-1)}, s^{(t)}, o, t) = \qquad \text{Eq. 12}$$

$$\begin{cases} 1 & \text{if } s^{(t-1)} = s_1 \wedge s^{(t)} = s_2 \wedge w \in \Theta(s_1, o, t-1) \wedge \\ & \quad isFiller(s_1) \wedge Slot(s_1) \neq Slot(s_2) \\ 0 & \text{otherwise} \end{cases}$$

In Eq. 12, the condition isFiller($s_1$) imposes a restriction that $s_1$ is a slot filler (not a slot preamble). Slot(s) stands for the semantic slot associated with the state s, which can be the slot's filler or its preamble. $\Theta(s_1, o, t-1)$ is a set that contains the two words in front of the longest sequence that ends at position t−1 and that is covered by the filler non-terminal for Slot($s_1$).

A next set of features, Slot Boundary Chunk Coverage feature (referred to as Slot Boundary feature 324 in FIG. 7) helps prevent the model from making mistakes like segmenting "Washington D.C." into two different cities. The slot boundary chunk coverage feature 324 is activated when a slot boundary within a task is covered by a CFG non-terminal (NT) as follows:

$$f_{c,NT}^{SB}(s^{(t-1)}, s^{(t)}, o, t) = \begin{cases} 1 & \text{if } f\ C(s^{(t)}) = c \wedge \text{covers}(NT, o_{t-1}^t) \wedge \\ & isFiller(s^{(t-1)}) \wedge isFiller(s^{(t)}) \wedge s^{(t-1)} \neq s^{(t)} \\ 0 & \text{otherwise} \end{cases} \quad \text{Eq. 13}$$

This feature shares its weight with Chunk Coverage feature 320 ($f_{t,NT}^{CC}(s^{(t-1)}, s^{(t)}, o_t^\tau, t)$), so no extra model parameters are introduced.

It is worth to noting that features similar to $f^{CC}$, $f^{SB}$ and $f^{PC}$ are not easily introduced in a generative model. The capability of incorporating these types of non-homogeneous and non-independent features is a benefit of conditional models such as CRFs.

It can thus be seen that using a conditional model in SLU or NLU can significantly reduce slot error rate over the generative HMM/CFG composite model. The introduction of the new features into the model helps reduce the error rate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A natural language understanding system, comprising:
   a decoder;
   a conditional random field model accessible by the decoder, the conditional random field model using a computer to assign a conditional probability of a state sequence given an observed vector of features to statistically model alignments between textual characters in an observed natural language input and semantic frames of a semantic structure, the semantic frames corresponding to states in the state sequence, wherein the conditional random field model models prior knowledge of relationships between elements of the semantic frames by assigning the conditional probability based on whether the observed vector of features includes command prior features, the command prior features being independent of the observed natural language input and indicative of a prior likelihood of commands defined by the semantic frames; and
   a computer processing unit, being a functional hardware component of the system and activated by the decoder and conditional model, facilitating modeling alignments.

2. The natural language understanding system of claim 1 wherein the textual characters comprise at least one of words and numbers.

3. The natural language understanding system of claim 2 wherein the conditional random field model models relationships between the textual characters and the elements of the semantic frames.

4. The natural language understanding system of claim 3 wherein the conditional random field model includes transition features indicative of a likelihood of transition between states defined by the semantic frames.

5. The natural language understanding system of claim 3 wherein the conditional random field model includes n-gram features indicative of a likelihood of an observed word or number given a state defined by the semantic frames.

6. The natural language understanding system of claim 3 and further comprising a grammar, having grammar rules, wherein the conditional random field model includes chunk coverage features indicative of a likelihood of a word or number that is covered by a grammar rule being assigned to a given semantic state.

7. The natural language understanding system of claim 6 wherein the given semantic state comprises a preamble state.

8. The natural language understanding system of claim 3 wherein the semantic frames define semantic slots and wherein the conditional random field model includes previous slot context features indicative of a likelihood of an alignment between a word or number and a state given a context of a slot previous to the state.

9. The natural language understanding system of claim 3 and further comprising a grammar having grammar rules for terminals and non-terminals, and wherein the conditional random field model includes a slot boundary feature indicative of a likelihood of an alignment of a set of words or numbers with different states given whether a boundary between the different states is covered by a grammar rule for a non-terminal.

10. The natural language understanding system of claim 1 wherein the natural language understanding system comprises a spoken language understanding system.

11. A method of performing natural language understanding, the method comprising:
    receiving a natural language input including observed text elements that comprise at least one of words and numbers;
    accessing a conditional random field model to assign elements of semantic frames that define slots to the observed text elements, wherein accessing the conditional random field model comprises accessing the conditional random field model that includes features that model prior knowledge of relationships between the observed text elements and the elements of the semantic frames, and features that model prior knowledge of relationships between the elements of the semantic frames by:
       modeling likelihood of transitions between slots defined by the semantic frames independent of the observed text elements; and
       modeling previous slot context indicative of a likelihood of an alignment between one of the observed text elements and a semantic frame given a context of a slot previous to the semantic frame; and
    assigning the elements of the semantic frames to the observed text elements using a processor of a computer.

12. A natural language understanding system comprising:
    a computer processing unit;
    a decoder;
    at least one grammar having grammar rules for terminals and non-terminals; and a conditional random field model accessible by the decoder, the conditional random field model being configured to model alignments between textual characters in an observed natural language input and semantic frames using the computer processing unit, wherein the semantic frames define semantic slots and the textual characters comprise at least one of words and numbers, wherein the conditional random field model models prior knowledge of relationships between elements of the semantic frames and models relationships between the textual characters and the elements of the semantic frames, the conditional random field model including features comprising:

chunk coverage features indicative of a likelihood of a word or number that is covered by a grammar rule being assigned to a given semantic state;

transition features indicative of a likelihood of transition between slots defined by the semantic frames independent of the observed natural language input; and a slot boundary feature indicative of a likelihood of an alignment of a set of words or numbers with different states given whether a boundary between the different states is covered by a grammar rule for a non-terminal; wherein the computer processing unit, being a functional hardware component of the system and activated by the decoder and conditional model facilitating modeling alignments.

13. The natural language understanding system of claim 12, wherein the given semantic state comprises a preamble state.

14. The natural language understanding system of claim 12, wherein the conditional random field model features comprise at least one of:

command prior features indicative of a prior likelihood of commands defined by the semantic frames;

previous slot context features indicative of a likelihood of an alignment between a word or number and a state given a context of a slot previous to the state; and n-gram features indicative of a likelihood of an observed word or number given a state defined by the semantic frames.

* * * * *